(12) United States Patent
Kim

(10) Patent No.: US 7,513,939 B2
(45) Date of Patent: Apr. 7, 2009

(54) WET TYPE AIR CLEANER

(75) Inventor: Woong Kim, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 688 days.

(21) Appl. No.: 11/268,580

(22) Filed: Nov. 8, 2005

(65) Prior Publication Data

US 2006/0096460 A1    May 11, 2006

(30) Foreign Application Priority Data

Nov. 8, 2004    (KR) .................. 10-2004-0090541
Nov. 17, 2004   (KR) .................. 10-2004-0094299

(51) Int. Cl.
*B01D 47/00* (2006.01)

(52) U.S. Cl. .................. 96/284; 96/283; 95/218

(58) Field of Classification Search .................. 96/281, 96/282, 283, 284, 285, 286, 287, 359; 95/218
See application file for complete search history.

(56) References Cited

U.S. PATENT DOCUMENTS 2,053,647 A * 9/1936 White .................. 261/91
2,396,526 A * 3/1946 Nilsson .................. 96/265
4,686,940 A   8/1987 Fullemann

FOREIGN PATENT DOCUMENTS

| DE | 20312576 | 12/2003 |
| KR | 1994-5178 | 3/1994 |
| NO | WO 99/15258 | * 4/1999 |
| WO | 1999/051324 | 10/1999 |

* cited by examiner

*Primary Examiner*—Duane S Smith
*Assistant Examiner*—Ives Wu
(74) *Attorney, Agent, or Firm*—Bacon & Thomas, PLLC

(57) ABSTRACT

A wet type air cleaner includes a housing storing cleaning water in a bottom portion thereof; and a purification unit installed in the housing. The purification unit includes: a blower unit for directing air to the cleaning water in the bottom of the housing; an inner guide for drawing up and dispersing radially the cleaning water in the bottom of the housing, the air directed by the blower unit flowing through the dispersed cleaning water; and an outer guide for guiding the directed air and the dispersed cleaning water into the cleaning water in the bottom of the housing, the outer guide surrounding the inner guide to form a gap therebetween, wherein the blower unit, the inner guide and the outer guide are together rotated by a driving unit.

13 Claims, 4 Drawing Sheets

WET TYPE AIR CLEANER

FIELD OF THE INVENTION

The present invention relates to an air cleaner; and, more particularly, to a wet type air cleaner with a purification unit for dispersing cleaning water and directing air to flow through the dispersed cleaning water to increase the contact area between the air and the cleaning water.

BACKGROUND OF THE INVENTION

In general, an air cleaner serves to purify indoor air containing fine dusts, various noxious gases, various germs, molds, viruses, etc., by using a purification medium. Such an air cleaner can be used through all seasons because it has various functions of removing unpleasant odors and small particles such as ticks, pollen and furs of pets, preventing an outbreak of disease due to an aerial infection, and so forth as well as its principal function of maintaining indoor air clean and pleasant.

Air cleaners can be largely classified into two types: dry type and wet type. Dry type air cleaners can be divided again into a filter type and an electric dust collection type.

Here, the electric dust collection type uses no filter, so it has a merit in that there is no need to replace filters. However, if dusts are accumulated on an electric dust collecting plate, purifying efficiency of the air cleaner will be deteriorated, and dust removing capacity thereof will also be undermined.

As for the filter type air cleaner, on the other hand, since various fine particles are captured while air passes through filters, the filter type air cleaner exhibits a high purifying efficiency, and thus is adequate for use in a season when yellow dust comes. However, since the filters need to be replaced periodically, maintenance cost thereof is high.

Meanwhile, a wet type air cleaner employs a method for making floating particles in suctioned air deposited in water by allowing the suctioned air to contact water. Though the wet type air cleaner has not been commonly utilized yet, it has many advantages in that it does not requires a replacement of filters and generates little noise, while providing a humidifying function as well. Thus, for children, its use is preferred. However, when using the wet type air cleaner, water should be replaced or replenished, which would be rather cumbersome.

There has been proposed a wet type air cleaner having a simple structure in which cleaning water is stored in a certain space, and a blower unit and a water spray unit are installed in a same space. One of such wet type air cleaners is disclosed in Japanese Patent Laid-open Publication No. 2000-334240, entitled "WET TYPE AIR CLEANER".

The wet type air cleaner includes an air circulation passage through which air is introduced into the inside of the air cleaner and then is outputted to the outside after being purified. A reservoir containing therein liquid to be sprayed is formed in a part of the air circulation passage. The air cleaner further includes a blower unit for allowing the air to be circulated through the air circulation passage and a spray unit for spraying the liquid into a spray space in the reservoir.

The blower unit includes a fan for suctioning the air into the spray space and a motor for driving the fan. The spray unit includes a pump for pumping up the liquid from the reservoir and a nozzle for spraying the liquid into the spray space.

Further, the air supplied into the air circulation passage typically flows downward after being introduced into the reservoir from upside, whereas the liquid is sprayed upward from downside. Therefore, the air introduced into the reservoir is brought into contact with fine liquid particles sprayed by the nozzle, thereby allowing noxious substances in the air to be adsorbed by the liquid.

In the conventional wet type air cleaner as described above, however, the blower unit for circulating the indoor air and the spray unit for spraying the liquid are installed individually. Therefore, separate motors are required to operate the blower unit and the spray unit, respectively, which increases the number of components of the air cleaner, resulting in a high manufacturing cost. Further, since the water is sprayed through the nozzle against the inner surface of the spray space, a high level of noise is caused.

Besides, in the conventional wet type air cleaner, droplets adsorbing fine dust are discharged to the outside together with the air, thereby resulting in a poor purification efficiency and an unexpected high humidity. Moreover, the contact between the cleaning water and the air is insufficient, so that the purification ability thereof is deteriorated.

SUMMARY OF THE INVENTION

It is, therefore, an object of the present invention to provide a wet type air cleaner with a purification unit for dispersing cleaning water and directing air to flow through the dispersed cleaning water to thereby increase the contact area between the air and the cleaning water.

In accordance with the present invention, there is provided a wet type air cleaner including: a housing storing cleaning water in a bottom portion thereof; and a purification unit installed in the housing, the purification unit including: a blower unit for directing air to the cleaning water in the bottom of the housing; an inner guide for drawing up and dispersing radially the cleaning water in the bottom of the housing, the air directed by the blower unit flowing through the dispersed cleaning water; and an outer guide for guiding the directed air and the dispersed cleaning water into the cleaning water in the bottom of the housing, the outer guide surrounding the inner guide to form a gap therebetween, wherein the blower unit, the inner guide and the outer guide are together rotated by a driving unit.

Preferably, the inner guide has a lower end portion whose bottom end is submerged in the cleaning water stored in the bottom of the housing; a middle portion with an inner diameter which is gradually increased upwardly from the top end of the lower end portion; an upper end portion with an inner diameter which is gradually increased upwardly from the top end of the middle portion, the inner diameter of the upper end portion being larger than that of the middle portion; and a nozzle portion circumferentially formed at the top end of the upper end portion, for dispersing the water drawn up along the inner guide.

Preferably, the blower unit includes a body portion fixed on a rotation shaft of the driving unit, a plurality of blades disposed around the body portion, and a frame fixed to the outer ends of the blades to surround them, and the nozzle portion of the inner guide is fixedly attached to the body portion of the blower unit by using a coupling member.

Preferably, the outer guide includes a fixed portion fixed to the frame of the blower unit, and an upper and a lower outer portion disposed around the upper end portion and the middle portion of the inner guide to form a gap therebetween, respectively, such that the air directed by the blades and the dispersed cleaning water from the nozzle portion are guided through the gap into the cleaning water in the housing.

Preferably, the fixed portion and the upper outer portion of the outer guide are connected to each other via a slanted reflecting wall, the reflecting wall being disposed to reflect the cleaning water dispersed from the nozzle portion upwardly toward the blades of the blower unit.

Preferably, the upper outer portion is extended in substantially parallel with the upper end portion of the inner guide and the lower outer portion is extended downwardly such that its inner diameter is gradually increased.

Preferably, the bottom end of the lower end portion is located below an outlet at the end of the lower outer portion.

Preferably, the outer guide a flow guide path is formed in the fixed portion of the outer guide, so that the cleaning water reflected upwardly by the reflecting wall is moved in and along the flow guide path by the centrifugal force imparted thereto by the rotation of the purification unit.

Alternatively, the inner guide may have a lower portion whose lower end is submerged in the cleaning water stored in the bottom of the housing; an upper portion with an inner diameter which is gradually increased upwardly from the top end of the lower portion; and a nozzle portion circumferentially formed at the top end of the upper end portion, for dispersing the water drawn up along the inner guide, the nozzle portion of the inner guide being fixed on a rotation shaft of the driving unit.

Further, the outer guide may include a fixed portion fixed to the frame of the blower unit, an upper outer portion with an inner diameter which is gradually decreased downwardly from the bottom end of the fixed portion and a lower outer portion with an inner diameter which is gradually increased downwardly from the bottom end of the upper outer portion, the lower outer portion being disposed to surround the inner guide to form a gap therebetween In this case, the nozzle portion is located under the connection point between the upper outer portion and the lower outer portion and the cleaning water is lies at a level below the nozzle portion. Further, the bottom end of the lower portion is located below an outlet at the end of the lower outer portion.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, a wet type air cleaner in accordance with preferred embodiments of the present invention will be described in detail with reference to the accompanying drawings.

Figure 1:
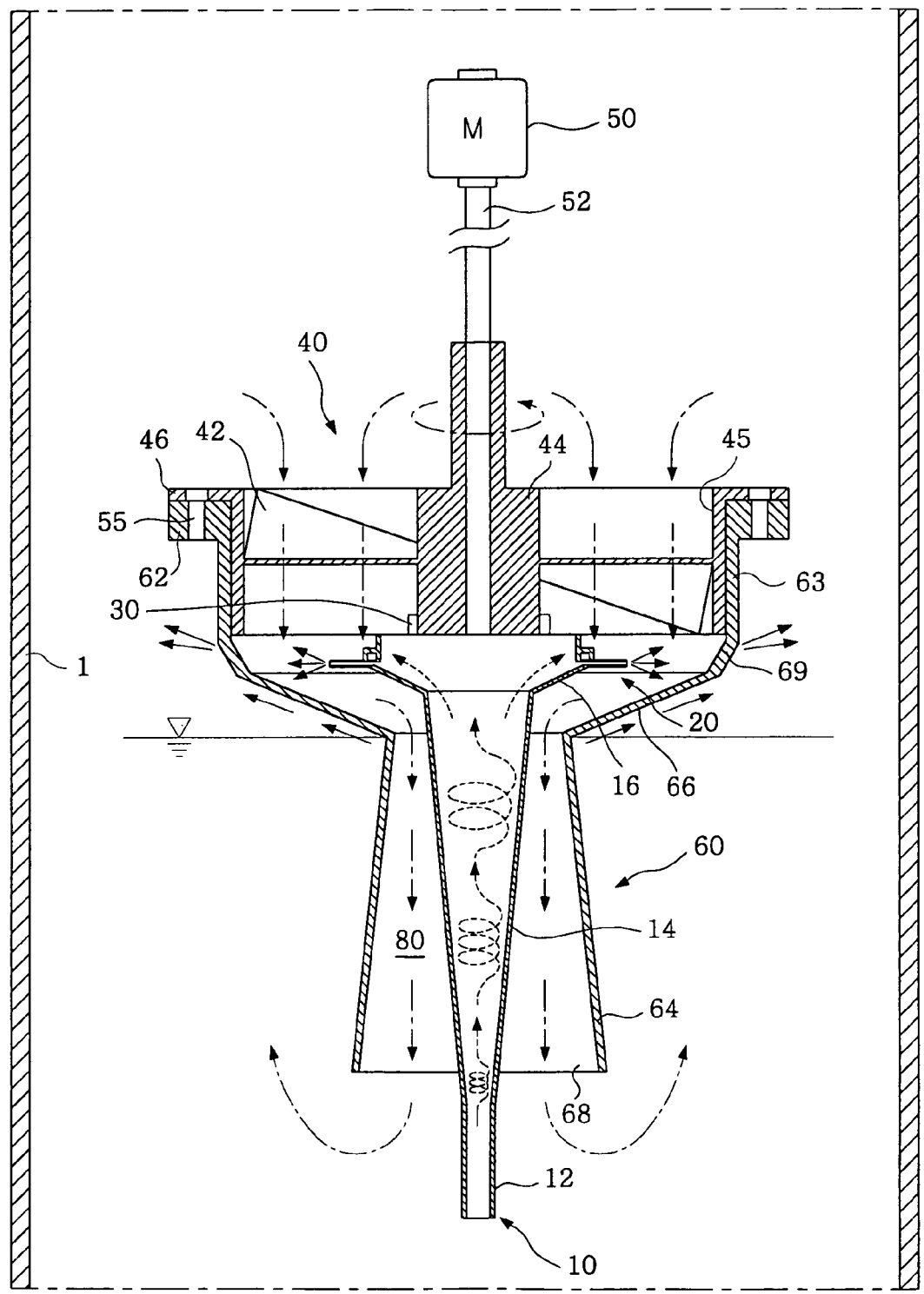
FIG. 1 sets forth a cross sectional view of a purification unit for use in a wet type air cleaner in accordance with a first preferred embodiment of the present invention.
Figure 2:
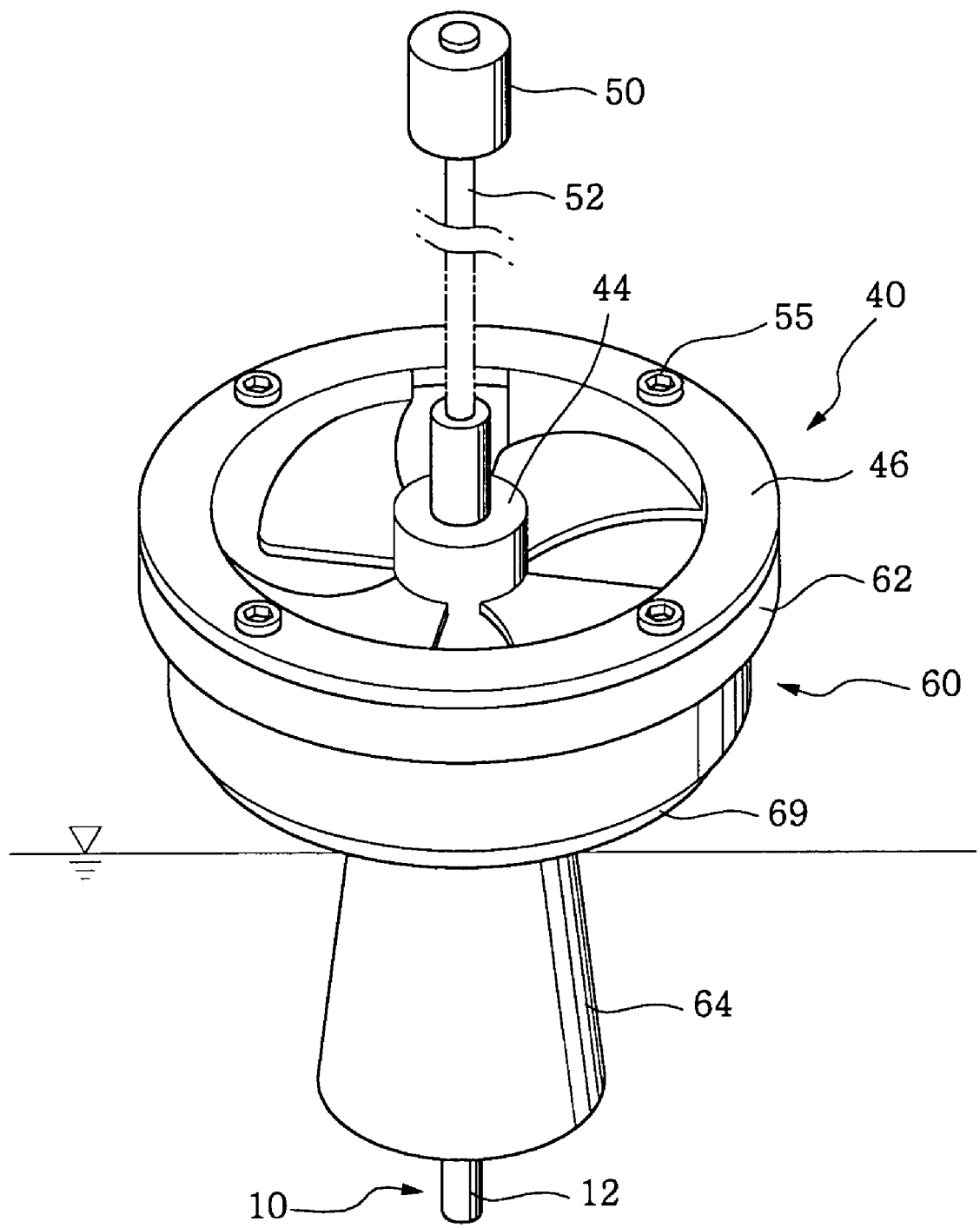
FIG. 2 provides a perspective view of the purification unit of the wet type air cleaner in FIG. 1.

FIG. 1 is a cross sectional view of a purification unit for use in a wet type air cleaner in accordance with a first preferred embodiment of the present invention, and FIG. 2 shows a perspective view of the purification unit.

As shown in FIGS. 1 and 2, the purification unit is installed in a housing 1 with an air inlet (not shown) and an air outlet (not shown), the housing 1 storing cleaning water in the bottom thereof. The purification unit includes a blower unit 40 for directing air introduced through the air inlet into the housing 1 toward the cleaning water in the bottom of the housing 1; an inner guide 10 for drawing up and dispersing radially the cleaning water in the bottom of the housing 1; and an outer guide 60 for guiding the directed air and the dispersed cleaning water into the cleaning water in the bottom of the housing 1.

The blower unit 40 includes a body portion 44 fixed on a rotation shaft 52 of a motor 50, a plurality of blades 42 disposed around the body portion 44, and a frame 45 fixed to the outer ends of the blades 42 to surround them.

When the rotation shaft 52 of the motor 50 is rotated, the blower unit 40 is rotated therewith, so that the air introduced through the air inlet into the housing 1 is drawn by the rotation of the blades 42 and is directed downward therethrough.

The inner guide 10 has a lower end portion 12 whose bottom end is submerged in the cleaning water stored in the bottom of the housing 1, a middle portion 14 with an inner diameter which is gradually increased upwardly from the top end of the lower end portion 12 and an upper end portion 16 with an inner diameter which is gradually increased upwardly from the top end of the middle portion 14, the inner diameter of the upper end portion 16 being significantly larger than that of the middle portion 14.

A nozzle portion 20 is circumferentially formed at the top end of the upper end portion 16, for dispersing the water drawn up along the inner guide 10. The nozzle portion 20 of the inner guide 10 is fixedly attached to the body portion 44 of the blower unit 40 by using a coupling member 30. Therefore, when the rotation shaft 52 of the motor 50 is rotated, the inner guide 10 is also rotated with blower unit 40, so that the cleaning water in the bottom of the housing 1 is drawn up along the inner guide by a centrifugal force exerted thereto.

Further, an outer guide 60 includes a fixed portion 63 fixed to the frame 45 of the blower unit 40 and an upper outer portion 66 and a lower outer portion 64 disposed around the upper end portion 16 and the middle portion 14 of the inner guide 10 to form a gap 80 therebetween, respectively, such that the air directed by the blades 42 and the dispersed cleaning water from the nozzle portion 20 are guided through the gap 80 into the cleaning water in the housing 1. The cleaning water preferably lies at the same level as the connection point of the upper outer portion 66 and the lower outer portion 64.

The fixed portion 63 of the outer guide 60 has a lower flange 62 with a plurality of holes and the frame 45 of the blower unit 40 has an upper flange 46 with a plurality of holes. The lower flange 62 and the upper flange 46 are coupled to each other by fastening screws 55 fitted into the corresponding holes thereof.

The fixed portion 63 and the upper outer portion 66 are connected to each other via a slanted reflecting wall 69. The reflecting wall 69 is disposed to reflect the cleaning water dispersed from the nozzle portion 20 upwardly toward the blades 42 of the blower unit 40.

The upper outer portion 66 is extended in substantially parallel with the upper end portion of the inner guide 10 and the lower outer portion 64 is extended downwardly such that its inner diameter is gradually increased.

The blower unit 40, the inner guide 10 and the outer guide 60 are rotated together by the rotation of the rotation shaft 52 of the motor 50.

The bottom end of the lower end portion 12 is located below an outlet 68 at the end of the lower outer portion 64, so that the contaminated water discharged through the outlet 68 is prevented from being drawn up through the lower end portion 12.

Figure 3:
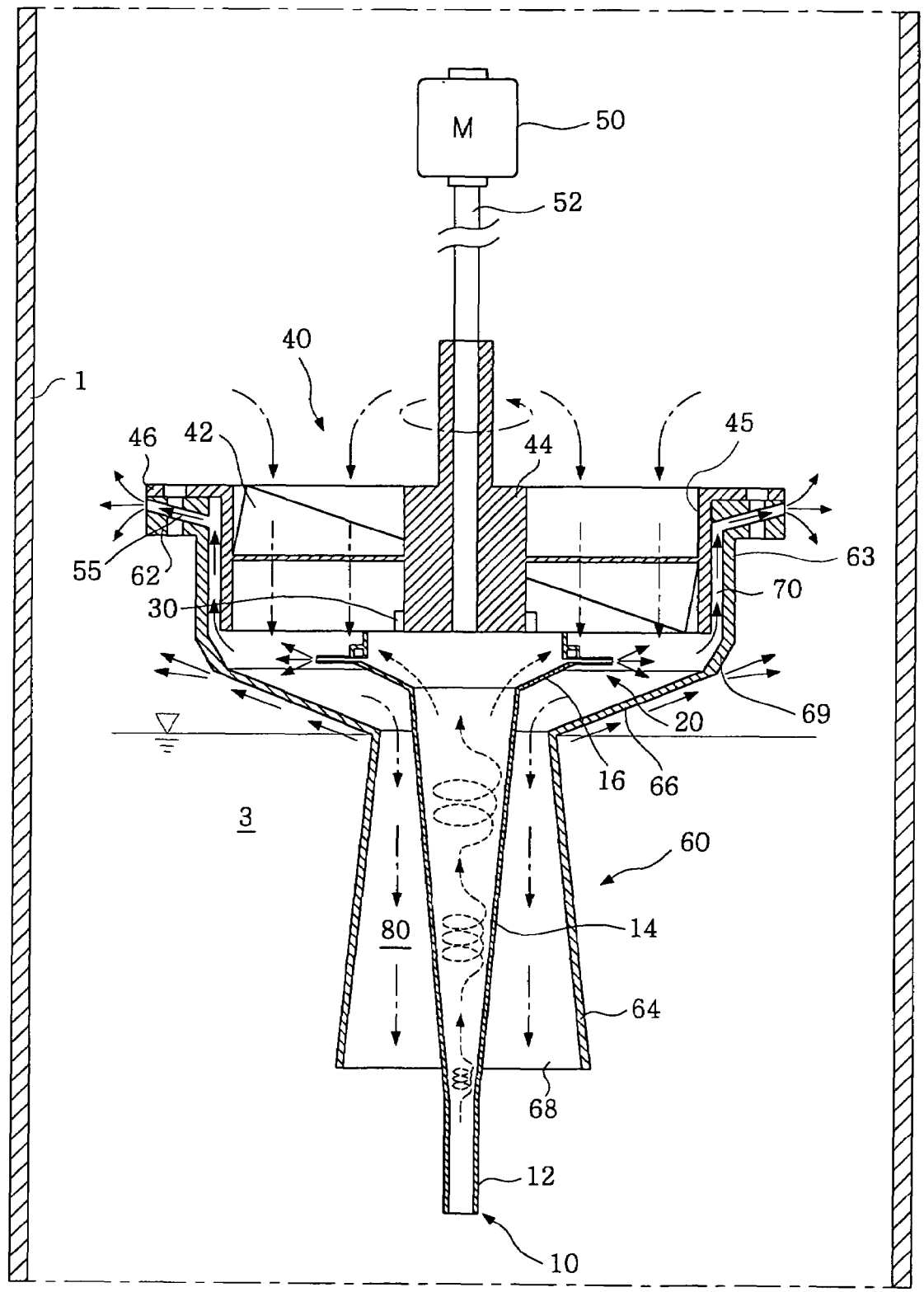
FIG. 3 presents a cross sectional view of a purification unit in accordance with a second preferred embodiment of the present invention.

Hereinafter, there will be described a purification unit in accordance with a second preferred embodiment of the present invention with reference to FIG. 3.

The purification unit of the second preferred embodiment is similar to that of the first preferred embodiment except for a flow guide path 70 formed in the fixed portion 63 of the outer guide 60.

The cleaning water reflected upwardly by the reflecting wall 66 is moved in and along the flow guide path 70 to be dispersed again from the outlet thereof by the centrifugal force imparted thereto due to the rotation of the purification unit.

Hereinafter, there will be described an operation of the purification unit in accordance with the above preferred embodiments of the present invention.

When the rotation shaft 52 is rotated by the motor 50, the blower unit 40, the inner guide 10 and the outer guide 60 are together rotated with the rotation shaft 52.

The air is suctioned by the rotation of the blades 42 to be directed downwardly therethrough. The cleaning water in the bottom of the housing 1 is drawn up by the rotation of the inner guide 10 to be dispersed radially through the nozzle portion 20. The air directed downwardly passes through the dispersed cleaning water to be first purified. That is, bacteria, dirt and the like in the air are adsorbed by the dispersed cleaning water.

When the water is finely dispersed, negative ions are generated due to the Lenard effect. The amount of the negative ions is greater than those generated by a high-pressure discharge and, also, such generated negative ions are close to natural negative ions.

The dispersed cleaning water from the nozzle portion 20 impacts on the reflecting wall 69 and is scattered to be mixed with the air. At this time, the space wherein the dispersed water impacts on the reflecting wall 69 is confined, so that the noise generated by the impact of the water is nearly transferred to the outside, thereby providing a relatively quiet environment.

Further, some of the scattered water droplets are moved upwardly to contact with the blades 42 and the air flowing therethrough, so that foreign materials in the air are adsorbed by the water droplets.

The water droplets adsorbing the foreign materials are dropped onto and flows along the inner surface of the upper outer portion 66 downwardly.

The water droplets and the air directed downwardly by the blower unit 40 pass through the gap 80 to be discharged through the outlet 68 into the cleaning water in the bottom of the housing 1. The water droplets and foreign materials in the air are merged onto the water in the bottom of the housing 1, and the clean air passes through the water to be discharged through the air outlet to the outside.

The air flowing through the water in the gap 80 is mixed with the water by the rotation of the lower outer portion 64, thereby facilitating the adsorption of the foreign materials in the air by the water.

Further, when the outer guide 60 is rotated, the cleaning water near outside of the upper outer portion 66 is drawn up along the outer surface of the upper outer portion 66 by the centrifugal force to be dispersed near at the connection point with the reflecting wall 69 to purify the air moving upward.

Meanwhile, in the second preferred embodiment, the water droplets reflected by the reflecting wall 69 move up by the centrifugal force in and along the flow guide path 70 to be dispersed. In this way, the number of contact between the air and the cleaning water is increased.

Now, there will be described a purification unit in accordance with a third preferred embodiment of the present invention with reference to FIG. 4.

Figure 4:
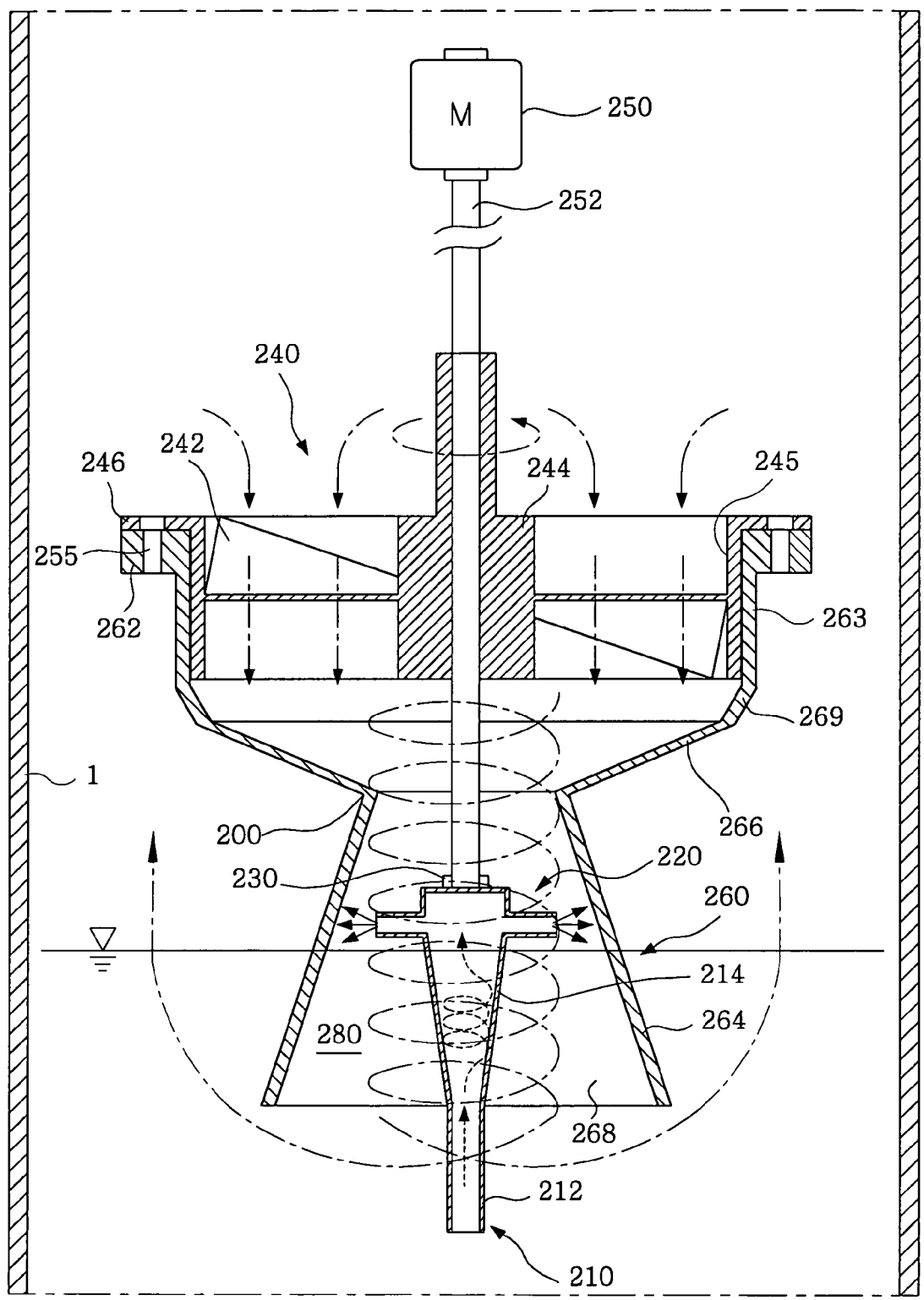
FIG. 4 depicts a cross sectional view of a purification unit in accordance with a third preferred embodiment of the present invention.

As shown in FIG. 4, the purification unit is installed in a housing 1 with an air inlet (not shown) and an air outlet (not shown), the housing 1 storing cleaning water in the bottom thereof. The purification unit includes a blower unit 240 for directing air introduced through the air inlet into the housing 1 to the cleaning water in the bottom of the housing 1; an inner guide 210 for drawing up and dispersing radially the cleaning water in the bottom of the housing 1; and an outer guide 260 for guiding the directed air and the dispersed cleaning water into the cleaning water in the bottom of the housing 1.

The blower unit 240 includes a body portion 244 fixed on a rotation shaft 252 of a motor 250, a plurality of blades 242 disposed around the body portion 244, and a frame 245 fixed to the outer ends of the blades 242 to surround them.

When the rotation shaft 252 of the motor 250 is rotated, the blower unit 240 is rotated therewith, so that the air introduced through the air inlet is drawn by the rotation of blades 242 into the housing 1 and flows downwardly therethorugh.

The inner guide 210 has a lower portion 12 whose lower end is submerged in the cleaning water stored in the bottom of the housing 1, and an upper portion 214 with an inner diameter which is gradually increased upwardly from the top end of the lower portion 212.

A nozzle portion 220 is circumferentially formed at the top end of the upper portion 216, for dispersing the water drawn up along the inner guide 210. The nozzle portion 220 of the inner guide 210 is fixed on the rotation shaft 252. Therefore, when the rotation shaft 52 of the motor 50 is rotated, the inner guide 10 is also rotated therewith, so that the cleaning water in the bottom of the housing 1 is drawn up along the inner guide by a centrifugal force exerted thereto.

Further, an outer guide 260 includes a fixed portion 263 fixed to the frame 245 of the blower unit 240, an upper outer portion 266 with an inner diameter which is gradually decreased downwardly from the bottom end of the fixed portion 263 and a lower outer portion 264 with an inner diameter which is gradually increased downwardly from the bottom end of the upper outer portion 266. The lower outer portion 264 is disposed to surround the inner guide 210 to form a gap 280 therebetween, such that the air directed by the blades 242 and the dispersed cleaning water from the nozzle portion 220 are guided through the gap 280 into the cleaning water in the housing 1. The nozzle portion 220 is located under a connection point 200 between the upper outer portion 266 and the lower outer portion 264 and the cleaning water is lies at a level below the nozzle portion 220.

The fixed portion 63 of the outer guide 60 has a lower flange 62 with a plurality of holes and the frame 45 of the blower unit 40 has an upper flange 46 with a plurality of holes. The lower flange 62 and the upper flange 46 are coupled to each other by fastening screws 55 fitted into the corresponding holes thereof.

The blower unit 240, the inner guide 210 and the outer guide 260 are rotated together by the rotation of the rotation shaft 252 of the motor 250.

The bottom end of the lower portion 212 is located below an outlet 268 at the end of the lower outer portion 264, so that the contaminated water discharged through the outlet 268 is prevented from being drawn up through the lower end portion 212.

Hereinafter, there will be described an operation of the purification unit in accordance with the third embodiment of the present invention.

When the rotation shaft 252 is rotated by the motor 250, the blower unit 240, the inner guide 210 and the outer guide 260 are together rotated with the rotation shaft 252.

The air is suctioned by the rotation of the blades 242 to be directed downwardly therethrough. The cleaning water in the bottom of the housing 1 is drawn up by the rotation of the inner guide 210 to be dispersed radially through the nozzle portion 220. The air directed downwardly passes through the dispersed cleaning water to be first purified. That is, foreign materials such as bacteria, dirt and the like in the air are adsorbed by the dispersed cleaning water.

When the water is finely dispersed, negative ions are generated due to the Lenard effect. The amount of the negative ions is greater than those generated by a high-pressure discharge and, also, such generated negative ions are close to natural negative ions.

Since the nozzle portion 220 is located below a connection point 200 between the upper outer portion 266 and the lower outer portion 264, the cleaning water dispersed from the nozzle portion 220 is prevented from moving upwardly toward the blower unit 240. The cleaning water dispersed from the nozzle portion 220 adsorbs foreign materials such as bacteria, dirt and the like in the air.

The water droplets adsorbing the foreign materials and the air directed downwardly by the blower unit 240 pass through the gap 280 to be discharged through the outlet 268 into the cleaning water in the bottom of the housing 1. The water droplets and foreign materials in the air are merged with the water in the bottom of the housing 1, and the clean air passes through the water to be discharged through the air outlet to the outside.

The air flowing through the water in the gap 280 is mixed with the water by the rotation of the lower outer portion 264, thereby facilitating the adsorption of the foreign materials in the air by the water.

In accordance with the wet type air cleaner employing the purification unit of the present invention, by the rotational force of the motor, the blower unit, the inner guide and the outer guide are together rotated, so that the cleaning water in the bottom of the housing can be pumped up without a separate pump, thereby resulting in a decreased manufacturing cost thereof. Further, the air directed downwardly contacts with the cleaning water several times, thereby increasing the purification efficiency thereof.

While the invention has been shown and descried with respect to the preferred embodiments, it will be understood by those skilled in the art that various changes and modifications may be made without departing from the spirit and scope of the invention as defined in the following claims.

What is claimed is:

1. A wet type air cleaner comprising:
   a housing storing cleaning water in a bottom portion thereof; and
   a purification unit installed in the housing, the purification unit including:
   a blower unit for directing air to the cleaning water in the bottom of the housing;
   an inner guide for drawing up and dispersing radially the cleaning water in the bottom of the housing, the air directed by the blower unit flowing through the dispersed cleaning water; and
   an outer guide for guiding the directed air and the dispersed cleaning water into the cleaning water in the bottom of the housing, the outer guide surrounding the inner guide to form a gap therebetween,
   wherein the blower unit, the inner guide and the outer guide are together rotated by a driving unit.

2. The air cleaner of claim 1, wherein the inner guide has a lower end portion whose bottom end is submerged in the cleaning water stored in the bottom of the housing; a middle portion with an inner diameter which is gradually increased upwardly from the top end of the lower end portion; an upper end portion with an inner diameter which is gradually increased upwardly from the top end of the middle portion, the inner diameter of the upper end portion being larger than that of the middle portion; and a nozzle portion circumferentially formed at the top end of the upper end portion, for dispersing the water drawn up along the inner guide.

3. The air cleaner of claim 2, wherein the blower unit includes a body portion fixed on a rotation shaft of the driving unit, a plurality of blades disposed around the body portion, and a frame fixed to the outer ends of the blades to surround them, and the nozzle portion of the inner guide is fixedly attached to the body portion of the blower unit by using a coupling member.

4. The air cleaner of claim 3, wherein the outer guide includes a fixed portion fixed to the frame of the blower unit, and an upper and a lower outer portion disposed around the upper end portion and the middle portion of the inner guide to form a gap therebetween, respectively, such that the air directed by the blades and the dispersed cleaning water from the nozzle portion are guided through the gap into the cleaning water in the housing.

5. The air cleaner of claim 4, wherein the fixed portion and the upper outer portion of the outer guide are connected to each other via a slanted reflecting wall, the reflecting wall being disposed to reflect the cleaning water dispersed from the nozzle portion upwardly toward the blades of the blower unit.

6. The air cleaner of claim 4, wherein the upper outer portion is extended in substantially parallel with the upper end portion of the inner guide and the lower outer portion is extended downwardly such that its inner diameter is gradually increased.

7. The air cleaner of claim 4, wherein the bottom end of the lower end portion of the inner guide is located below an outlet at the end of the lower outer portion.

8. The air cleaner of claim 4, wherein a flow guide path is formed in the fixed portion of the outer guide, so that the cleaning water reflected upwardly by the reflecting wall is moved in and along the flow guide path by the centrifugal force imparted thereto by the rotation of the purification unit.

9. The air cleaner of claim 1, wherein the inner guide has a lower portion whose bottom end is submerged in the cleaning water stored in the bottom of the housing; an upper portion with an inner diameter which is gradually increased upwardly from the top end of the lower portion; and a nozzle portion circumferentially formed at the top end of the upper end portion, for dispersing the water drawn up along the inner guide, the nozzle portion of the inner guide being fixed on a rotation shaft of the driving unit.

10. The air cleaner of claim 9, wherein the blower unit includes a body portion fixed on the rotation shaft of the driving unit, a plurality of blades disposed around the body portion, and a frame fixed to the outer ends of the blades to surround them.

11. The air cleaner of claim 10, wherein the outer guide includes a fixed portion fixed to the frame of the blower unit, an upper outer portion with an inner diameter which is gradually decreased downwardly from the bottom end of the fixed portion and a lower outer portion with an inner diameter which is gradually increased downwardly from the bottom end of the upper outer portion, the lower outer portion being disposed to surround the inner guide to form a gap therebetween.

12. The air cleaner of claim 11, wherein the nozzle portion is located under a connection point between the upper outer portion and the lower outer portion and the cleaning water is lies at a level below the nozzle portion.

13. The air cleaner of claim 11, wherein the bottom end of the lower portion is located below an outlet at the end of the lower outer portion.

* * * * *